United States Patent
Ferdowsi et al.

(10) Patent No.: US 10,891,637 B2
(45) Date of Patent: *Jan. 12, 2021

(54) COMPUTER SYSTEM AND COMPUTER-EXECUTED METHOD FOR INVENTORY VALUATION

(71) Applicant: Groupon, Inc., Chicago, IL (US)

(72) Inventors: Zahra Ferdowsi, Chicago, IL (US); Rajesh Girish Parekh, San Jose, CA (US)

(73) Assignee: GROUPON, INC., Chicago, IL (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/122,247

(22) Filed: Sep. 5, 2018

(65) Prior Publication Data

US 2019/0139060 A1 May 9, 2019

Related U.S. Application Data

(63) Continuation of application No. 14/832,684, filed on Aug. 21, 2015, now Pat. No. 10,157,392.

(60) Provisional application No. 62/040,916, filed on Aug. 22, 2014.

(51) Int. Cl.
*G06Q 30/02* (2012.01)

(52) U.S. Cl.
CPC ..... *G06Q 30/0202* (2013.01); *G06Q 30/0206* (2013.01)

(58) Field of Classification Search
CPC ......... G06Q 10/00; G06Q 40/00; G06Q 40/06
USPC .......................................................... 705/7.31
See application file for complete search history.

(56) References Cited

U.S. PATENT DOCUMENTS

| | | | |
|---|---|---|---|
| 6,144,945 A | 11/2000 | Garg et al. | |
| 6,606,744 B1* | 8/2003 | Mikurak | H04L 29/06 717/174 |
| 7,685,028 B2* | 3/2010 | Gross | G06Q 10/06 705/28 |
| 8,140,399 B1* | 3/2012 | Goel | G06Q 10/02 705/26.1 |
| 8,478,632 B2 | 7/2013 | Veit et al. | |
| 8,606,965 B1 | 12/2013 | Parasnis | |
| 9,557,889 B2 | 1/2017 | Raleigh et al. | |
| 2005/0283412 A1 | 12/2005 | Cheng et al. | |
| 2008/0208678 A1* | 8/2008 | Walser | G06Q 10/06 705/7.31 |
| 2008/0281662 A1 | 11/2008 | Ginsburg et al. | |

(Continued)

*Primary Examiner* — Romain Jeanty
(74) *Attorney, Agent, or Firm* — Alston & Bird LLP

(57) ABSTRACT

Certain embodiments provide a computer-executed method for generating a future sales estimate for an item. The method includes programmatically accessing, from a dataset via a network device, an inventory residence time period of an item. The method also includes programmatically accessing, from the dataset via the network device, prior performance data associated with the item. The method also includes programmatically executing an inventory valuation engine to generate a future sales estimate for the item based on the inventory residence time period and the prior performance data. The method further includes executing a notification generation engine to adjust a notification policy defining a frequency or other characteristic of electronic marketing communications indicating the item transmitted to consumer devices based on the future sales estimate.

27 Claims, 5 Drawing Sheets

(56) References Cited

U.S. PATENT DOCUMENTS

| | | |
|---|---|---|
| 2009/0276317 A1 | 11/2009 | Dixon et al. |
| 2010/0257000 A1* | 10/2010 | Harris .................... G06Q 30/08 |
| | | 705/5 |
| 2011/0112924 A1* | 5/2011 | Chatter ................ G06Q 40/025 |
| | | 705/26.3 |
| 2011/0202410 A1 | 8/2011 | Ginsburg et al. |
| 2014/0180809 A1 | 6/2014 | Boal |
| 2014/0200946 A1 | 7/2014 | Humphries et al. |
| 2014/0257912 A1 | 9/2014 | Hsieh et al. |
| 2014/0278804 A1* | 9/2014 | Lanxner ............. G06Q 30/0206 |
| | | 705/7.35 |
| 2015/0066570 A1 | 3/2015 | Hellen et al. |

* cited by examiner

COMPUTER SYSTEM AND COMPUTER-EXECUTED METHOD FOR INVENTORY VALUATION

CROSS-REFERENCE TO RELATED APPLICATIONS

This application is a continuation of U.S. patent application Ser. No. 14/832,685, titled "Computer System and Computer-Executed Method for Inventory Valuation," which was filed on Aug. 21, 2015, and claims the benefit of U.S. Provisional Patent Application No. 62/040,916, titled "Computer System And Computer-Executed Method for Inventory Valuation," filed Aug. 22, 2014.

All of the applications identified above are incorporated by reference herein in their entirety.

TECHNOLOGICAL FIELD

Example embodiments of the present invention relate generally to generating valuations of items in inventory.

BACKGROUND

Certain commercial entities maintain inventories of items for sale. In this regard, areas for improving conventional techniques for automated and programmatic valuation of an item in inventory have been identified and technical solutions have been implemented in exemplary embodiments.

BRIEF SUMMARY

Certain embodiments provide a computer-executed method for programmatically generating a valuation for an item. In one embodiment, generation of the valuation may involve generating a future sales estimate for the item. The method may include programmatically accessing, from a dataset via a network device, an inventory residence time period of an item. The method also includes programmatically accessing, from the dataset via the network device, prior performance data associated with the item. The method may also include programmatically executing an inventory valuation engine to generate a future sales estimate for the item based on the inventory residence time period and the prior performance data. The method may further include storing, on a non-transitory computer-readable storage device, the future sales estimate in association with an identification of the item and the inventory residence time period of the item. The method may further include: programmatically executing a notification generation engine to adjust a notification policy of electronic marketing communications indicating the item transmitted to consumer devices based on the future sales estimate; and programmatically executing the notification generation engine to provide the electronic marketing communications to the consumer devices based on the adjusted notification policy. For example, the notification policy may specify or define a frequency of electronic marketing communications indicating the item sent to the consumer devices.

Certain other embodiments provide a non-transitory computer readable medium having encoded thereon one or more computer-executable instructions that, when executed on a computer, cause performance of a computer-executed method for generating a valuation for an item. In one embodiment, generation of the valuation may involve generating a future sales estimate for the item. The method may include programmatically accessing, from a dataset via a network device, an inventory residence time period of an item. The method may also include programmatically accessing, from the dataset via the network device, prior performance data associated with the item. The method may also include programmatically executing an inventory valuation engine to generate a future sales estimate for the item based on the inventory residence time period and the prior performance data. The method further includes storing, on a non-transitory computer-readable storage device, the future sales estimate in association with an identification of the item and the inventory residence time period of the item. The method may further include: programmatically executing a notification generation engine to adjust a notification policy of electronic marketing communications indicating the item transmitted to consumer devices based on the future sales estimate; and programmatically executing the notification generation engine to provide the electronic marketing communications to the consumer devices based on the adjusted notification policy.

Certain other embodiments provide an apparatus operable on a distributed computing system. The apparatus includes a non-transitory dataset storage module, the non-transitory dataset storage module storing an inventory residence time period and prior performance data associated with an item. The apparatus also includes an inventory valuation engine programmed or configured to: programmatically access, from the dataset storage module via a network device, the inventory residence time period associated with the item, programmatically access, from the dataset storage module via the network device, the prior performance data associated with the item, generate a future sales estimate for the item based on the inventory residence time period and the prior performance data; and store, on the non-transitory dataset storage module, the future sales estimate in association with an identification of the item and the inventory residence time period of the item. The method may further include: programmatically executing a notification generation engine to adjust a notification policy of electronic marketing communications indicating the item transmitted to consumer devices based on the future sales estimate; and programmatically executing the notification generation engine to provide the electronic marketing communications to the consumer devices based on the adjusted notification policy.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

DETAILED DESCRIPTION

I. Overview

Figure 1:
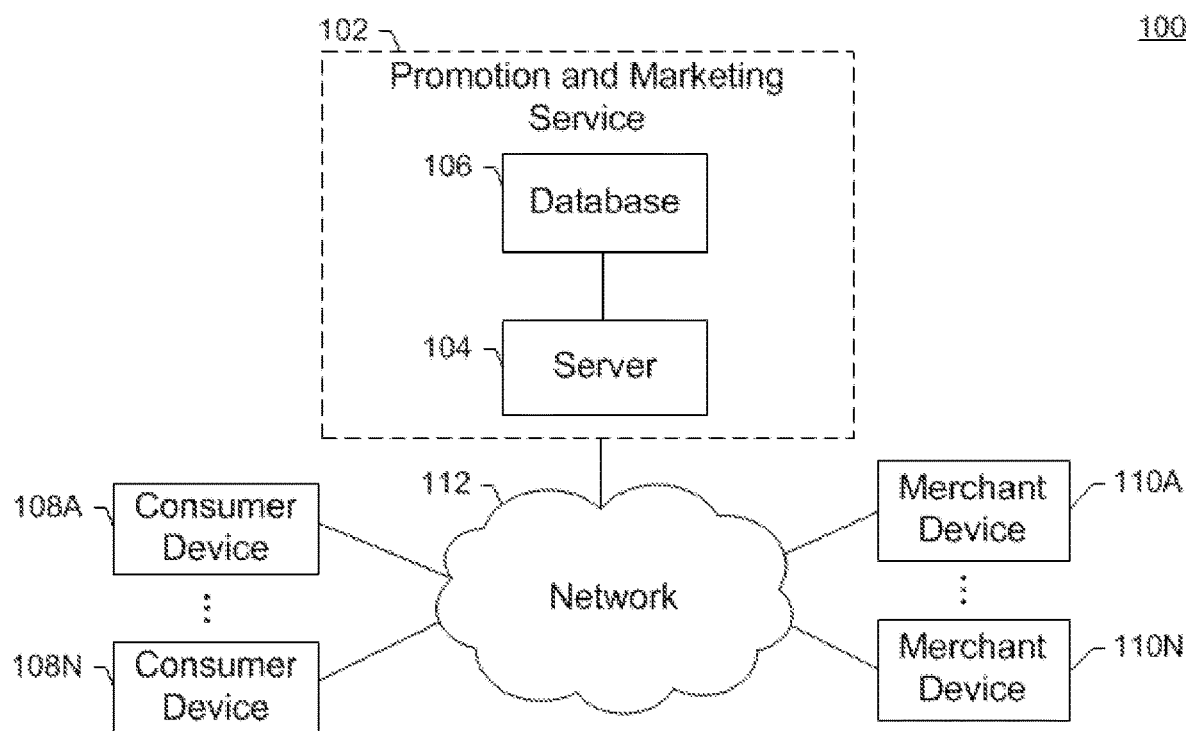
FIG. 1 is a block diagram illustrating an exemplary system within which exemplary embodiments may operate.

Exemplary embodiments provide computer systems, computer-executable methods and one or more non-transitory computer-readable media for automated and programmatic valuation of an item in inventory. Conventional inventory valuation techniques tend to overestimate inventory values and fail to account for numerous relevant factors that predict future sales and that determine the value of the inventory. Certain conventional inventory valuation techniques value an item in inventory by subtracting the quantity in inventory from the forecasted demand for the item to generate an indication of unfulfilled demand. However, this conventional valuation technique is deficient as the quantity in inventory is not guaranteed to be sold in the future. For example, just because there are 25,000 units of pizza in inventory does not mean that all 25,000 units will be sold. This assumption may result in a gross overestimation of the value of the inventory. Certain other conventional valuation techniques account for the prior performance of the item and the number of consumers in the vicinity of the item. However, these techniques assume that all potential consumers in the vicinity of the item will purchase the item, which also results in an overestimation of the value of the inventory.

To address these deficiencies in conventional valuation techniques, exemplary embodiments implement inventory valuation methods, systems and apparatuses that programmatically generate a valuation of an item in inventory. In one embodiment, the valuation may take the form of a future sales estimate of an item that constitutes a realistic projection on the sales given prior performance data on the item. In generating the future sales estimate, exemplary embodiments may take into account, for example, prior performance data on the item which may include, for example, prior sales data. The prior performance data may include data on the sales of the item during a "feature time period" and/or data on the sales of the item during an "inventory residence time period."

As used herein, the term "feature time period" refers to a time period in the life of an item during which the item is featured, heavily advertised, heavily marketed or otherwise emphasized to consumers. For example, consumers may be notified of the item in a special "featured item" section of a consumer interface.

As used herein, the term "inventory residence time period" refers to a time period in the life of an item during which the item is not featured, heavily marketed, heavily advertised or otherwise emphasized to consumers. For example, consumers may not be notified of the item in a special "featured item" section of a consumer interface. During the "inventory residence time period," the item may be considered to be "in inventory." In some cases, the inventory residence time period may start immediately after the feature time period ends in the life of an item.

In addition to prior performance data, exemplary embodiments may take into account the age of the item in inventory or how long the item has resided in inventory (the "inventory residence time period"). This enables embodiments to take into account how "fresh" or "stale" an item is, and to therefore adjust the valuation of the inventory downward based on its staleness. This technique improves the accuracy of inventory valuation as items that have been in inventory for long periods of time may not sell as well as newer items.

By accounting for factors that reliably and accurately predict future sales, exemplary embodiments avoid overestimation of the valuation of an inventory. In certain situations, it may be preferable to underestimate inventory valuation rather than overestimate. The consequence of underestimation is having more items than required to meet demand. This is costly but is less costly than overestimating inventory valuation. In the case of overestimating inventory valuation, the cost is not having sufficient items in inventory to meet existing demand.

In one exemplary embodiment, an item in inventory may be evaluated based on how long it has resided in inventory, i.e., the length of its inventory residence time period. It may be determined whether the inventory residence time period falls within one of multiple predefined time segments, for example, less than 2 weeks, 2-4 weeks, 4 or more weeks. The future sales estimate may be generated by discounting the prior performance data using a discount level, and the discount level may be based on the time segment. In certain non-limiting embodiments, the longer the time segment (i.e., the longer the inventory residence time period), the greater may be the discount level. In this manner, items of different inventory ages may be evaluated differently to account for their staleness in estimating future sales.

In one example, for items maintained in inventory for less than 2 weeks, future sales for the next four-week period may be predicted to be about 30% of past sales during the feature time period of the item. For items maintained in inventory for 2-4 weeks, future sales for the next four-week period may be predicted to be about 85% of past sales during the inventory residence time period of the item, exclusive of sales data from the feature time period. For items maintained in inventory for 4 or more weeks, future sales for the next four-week period may be predicted to be about 70% of past sales during the last four weeks in the inventory residence time period of the item, exclusive of sales data from the feature time period.

In certain embodiments, the item in inventory may be any type of a commercial object that may be purchased and sold including, but not limited to, a good, a product, a service, an experience, and the like. In one embodiment, the item in inventory may be the subject of a promotion offered by a promotion and marketing service, where the promotion offers a discount in the base price of the item.

II. Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "consumer interface" may include any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant web site or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, web sites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "voucher" may include, but is not limited to, any type of gift card, tender, electronic certificate, medium of exchange, or the like, that embodies the terms of the promotion from which it results and which may be used toward at least a portion of the purchase, acquisition, procurement, consumption, or the like, of goods, services and/or experiences. In some examples, a voucher may take the form of tender that has a given value that is exchangeable for goods, services and/or experiences and/or a reduction in a purchase price of a particular good, service or experience. In some examples, the voucher may have multiple values, such as an accepted value, a promotional value and/or a residual value. For example, using the aforementioned running company as the example provider, a voucher may comprise an electronic indication in a mobile application that shows $50 of value to spend at the running company. In some examples, the accepted value of the voucher is defined by the value exchanged for the voucher. In some examples, the promotional value of the voucher is defined by the promotion from which the voucher resulted and is the value of the voucher beyond the accepted value. In some examples, the residual value of the voucher is the value after redemption, the value after the expiry or other violation of a redemption parameter, the return or exchange value of the voucher, or the like.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "feature time period" refers to a time period in the life of an item during which the item is featured, heavily advertised, heavily marketed or otherwise emphasized to consumers. For example, consumers may be notified of the item in a special "featured item" section of a consumer interface.

As used herein, the term "inventory residence time period" refers to a time period in the life of an item during which the item is not featured, heavily marketed, heavily advertised or otherwise emphasized to consumers. For example, consumers may not be notified of the item in a special "featured item" section of a consumer interface. During the "inventory residence time period," the item may be considered to be "in inventory." In some cases, the inventory residence time period may start immediately after the feature time period ends in the life of an item.

As used herein, the terms "mobile computing device" and "mobile device" refer to any computing or communication device that is portable and is transported in normal usage (e.g., the iPhone™ mobile communication device, the Android™ mobile communication device, and the like), and that is capable of communication and that has sufficient processor power and memory capacity to perform the operations described herein. For example, and without limitation, a mobile computing device may include a smartphone, a table computer, a laptop computer, and the like.

As used herein, the term "module," encompasses hardware, software and/or firmware configured to perform one or more particular functions.

As used herein, the term "computer-readable medium" refers to a non-transitory storage hardware, non-transitory storage device or non-transitory computer system memory that may be accessed by a controller, a microcontroller, a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

III. System Architecture and Example Apparatus

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system 100 within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, information on an item in inventory, prior performance data on an item, future sales estimates for an item, demand data for an item, a cap or maximum limit on the number of units of an item for sale, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 3.

Figure 2:
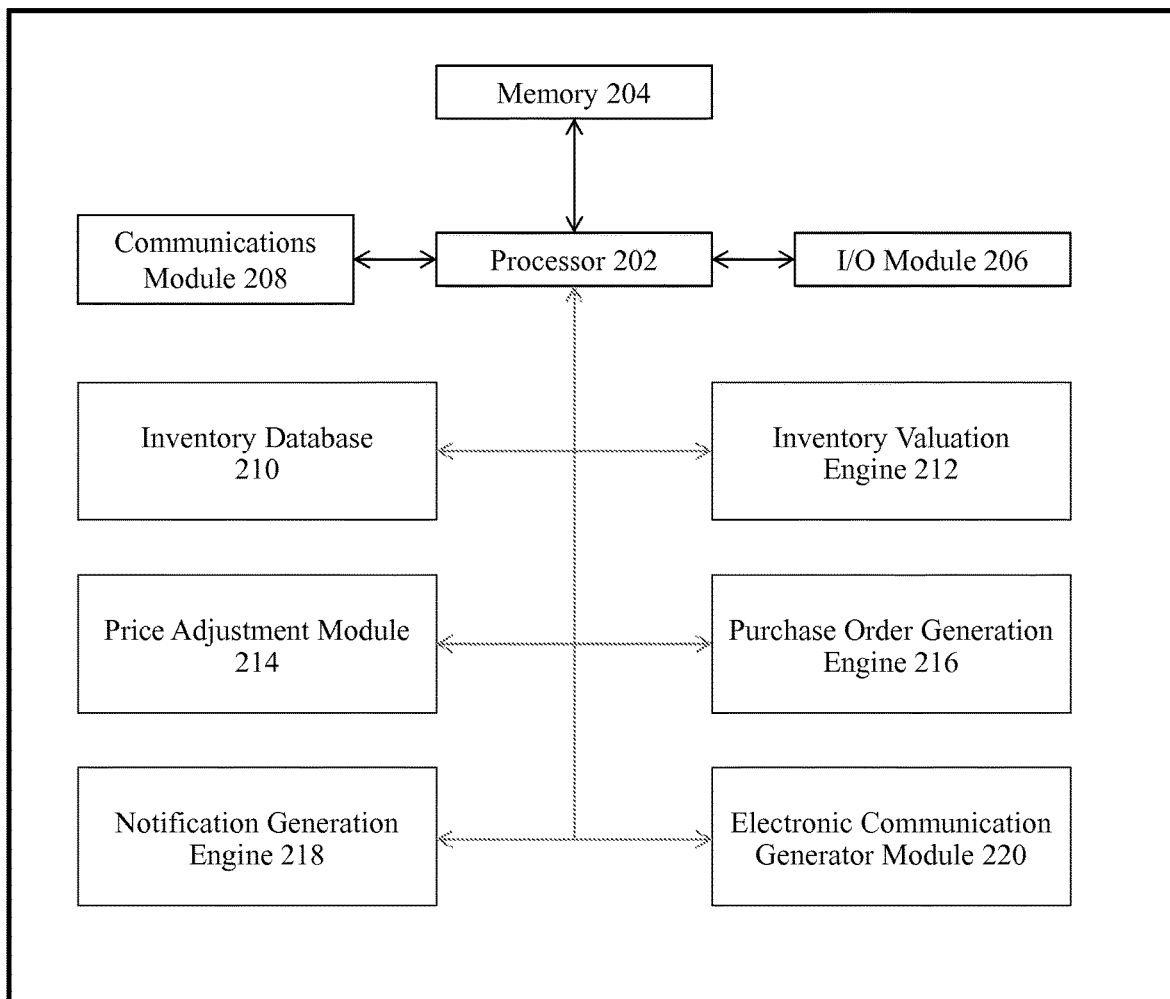
FIG. 2 is a block diagram illustrating exemplary modules of a computing device for use in a promotional server in accordance with certain exemplary embodiments.

IV. Example Apparatuses for Implementing Embodiments of the Present Invention The server 104 may be embodied by one or more computing systems, such as apparatus 200 shown in FIG. 2. As illustrated in FIG. 2, the apparatus 200 may include a processor 202, a memory 204, input/output circuitry 206, and communications circuitry 208. The apparatus 200 may be configured to execute the operations described above with respect to FIG. 1 and below with respect to FIG. 3. Although the components of FIG. 2 are described with respect to functional limitations, it should be understood that the particular implementations necessarily include the use of particular hardware. It should also be understood that certain of the components of FIG. 2 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In one embodiment, the processor 202 may be configured to programmatically access data from and store data to an inventory database 210 that may be used to store data on an item in inventory. Exemplary data may include, but is not limited to, prior performance data (e.g., prior sales data) of the item, an inventory residence time period of the item, a future sales estimate generated for the item, a cap or maximum limit on the number of units of the item sold, and the like.

In one embodiment, the apparatus 200 may include and the processor 202 may be configured to programmatically execute an inventory valuation engine 212 that is programmed or configured to generate a numerical indication of the value of an item in inventory. In one embodiment, the valuation may indicate a future sales estimate of the item. The apparatus 200 may include circuitry configured to perform the functions associated with the inventory valuation engine 212 disclosed herein.

In one embodiment, the apparatus 200 may include and the processor 202 may be configured to programmatically execute a price adjustment module 214 that is programmed or configured to adjust, upward or downward, a price of an item. The apparatus 200 may include circuitry configured to perform the functions associated with the price adjustment module 214 disclosed herein.

In one embodiment, the apparatus 200 may include and the processor 202 may be configured to programmatically execute a purchase order generation engine 216 that is programmed or configured to generate a purchase order for purchasing additional units of an item. The apparatus 200 may include circuitry configured to perform the functions associated with the purchase order generation engine 216 disclosed herein.

In one embodiment, the apparatus 200 may include and the processor 202 may be configured to programmatically execute a notification generation engine 218 that is programmed or configured to generate notifications of an item for consumers. The apparatus 200 may include circuitry configured to perform the functions associated with the notification generation engine 218 disclosed herein.

In one embodiment, the apparatus 200 may include and the processor 202 may be configured to programmatically execute an electronic communication generator module 220 that is programmed or configured to transmit computer-executable instructions to an external computing device. In one example, the computer-executable instructions may transmit a purchase order and cause the external computing device to initiate a purchase action. In another example, the computer-executable instructions may cause a notification of an item to be displayed on an external display device. The apparatus 200 may include circuitry configured to perform the functions associated with the electronic communication generator module 220 disclosed herein.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

V. Example Electronic Marketing Information Service Data Flow

Figure 3:
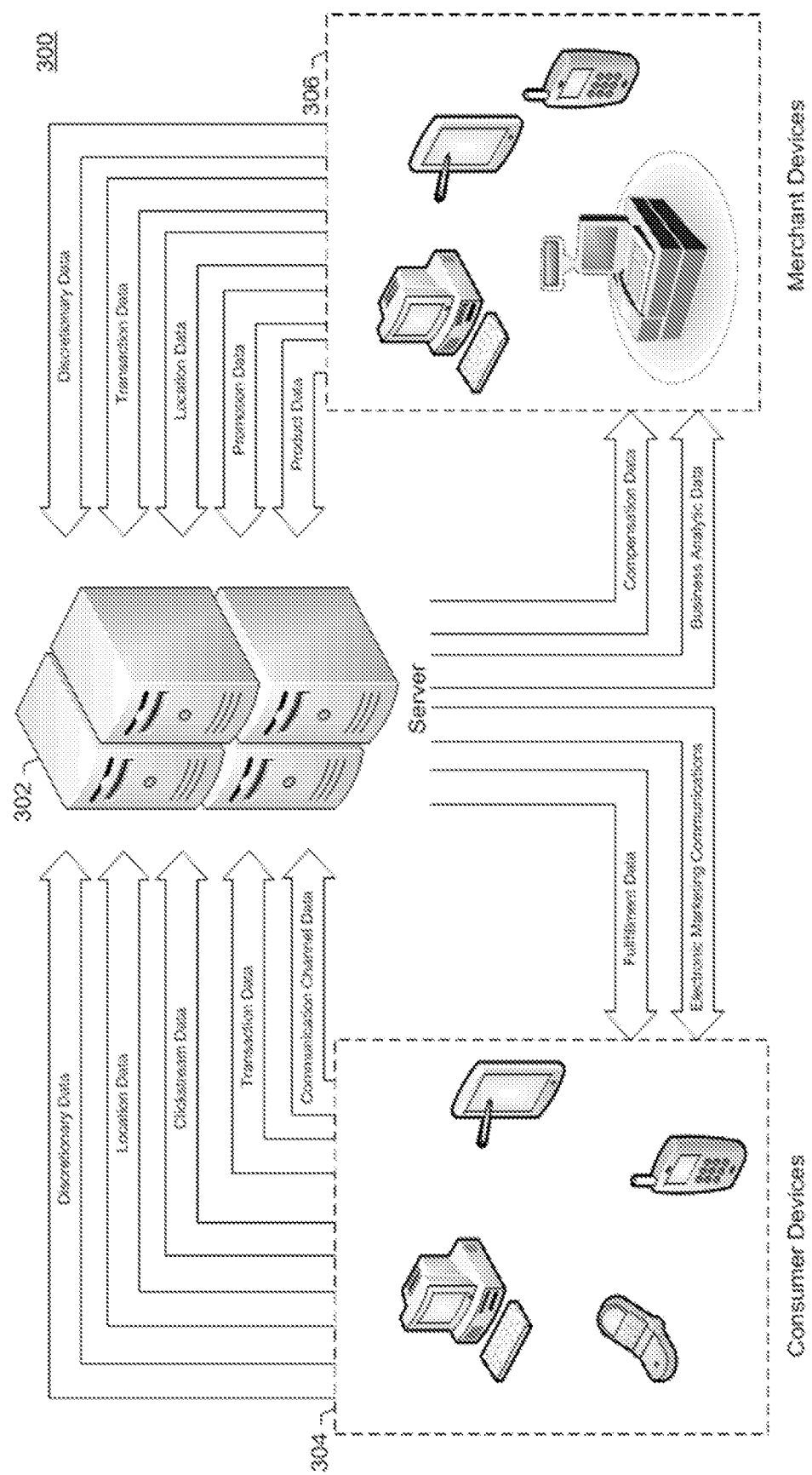
FIG. 3 is a block diagram illustrating exemplary modules of a computing device for use by a consumer or merchant in accordance with an exemplary embodiment.

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

VI. Exemplary Techniques, Apparatuses and Systems for Inventory Valuation

Figure 4:
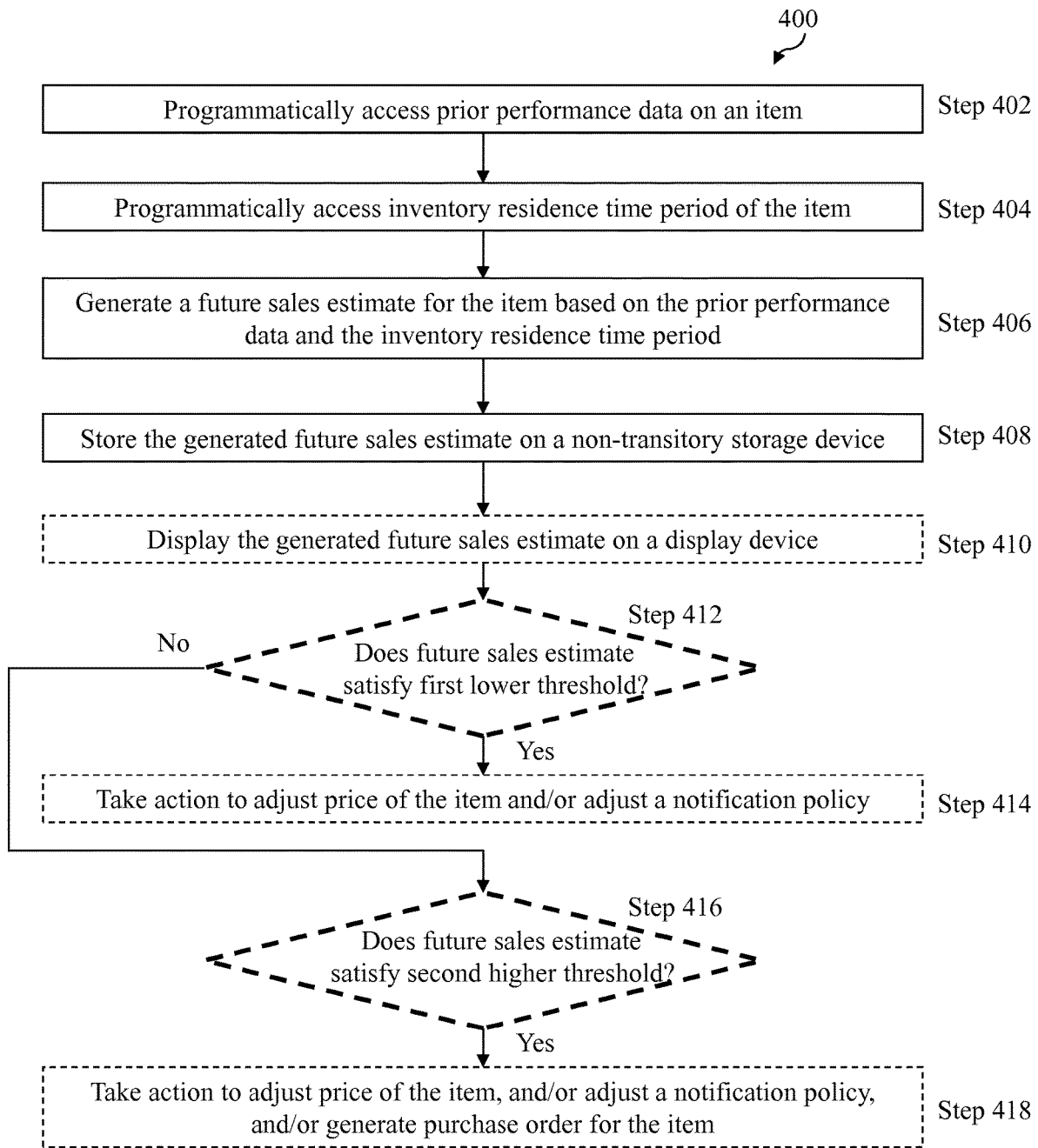
FIG. 4 is a flowchart illustrating an exemplary computer-executable method for programmatically valuing an item in inventory.

FIG. 4 is a flowchart illustrating an exemplary computer-executable method 400 for generating a future sales estimate for an item. The method 400 of FIG. 4 enables accurate and up-to-date valuation of the inventory of an item by considering the past performance of the item in the marketplace. In some embodiments, the valuation of the item in inventory may be based on a future sales estimate of the item. In some embodiments, one or more actions may be taken based on the valuation of the item in inventory, for example, by setting a price for the item, by updating a desired inventory level for the item, by placing additional orders for the item, and the like. In one example, the item may be a promotion offered by a promotion and marketing service. In another example, the item may be any good, product, service or experience that may be purchased and sold.

In step 402, prior performance data on past commercial activities associated with the item may be programmatically accessed. In one example, the prior performance data may be accessed using database commands from the inventory database 210, and the data may be received via a network device. The prior performance data may indicate the past performance or success of offers of the item in generating purchases of the item. In one example, the prior performance data may include a conversion rate which is the percentage of offers of the item that generated in purchases. In another example, the prior performance data may indicate a sales rate (e.g., amount or volume of sales per unit time period).

In certain cases, the prior performance data may be segmented into two or more groups of prior performance data, each group associated with a different time period during which the item was offered for sale. In one example, the prior performance data may be segmented into a first group (a feature time period) during which the item was offered for sale as a featured item, and a second group (an inventory residence time period) during which the item was in inventory and was offered for sale as a non-featured item.

In step 404, data on the time spent by the item in inventory (i.e., an "inventory residence time period") may be programmatically accessed. In one example, the inventory residence time period may be accessed using database commands from the inventory database 210, and the data may be received via a network device. The inventory residence time period may indicate how long the item was in inventory, during which time it was offered for sale as a non-featured item. In one example, the inventory residence time period may indicate a number of days, a number of weeks, a number of months, a number of years, and the like.

In step 406, the inventory valuation engine 212 may be programmatically executed to generate a future sales estimate for the item based on the inventory residence time period and the prior performance data. One exemplary technique implemented in step 406 is disclosed herein in connection with FIG. 5.

In step 408, the generated future sales estimate may be stored on a non-transitory computer-readable storage medium in association with an identification of the item and an identification of the inventory residence time period. In one embodiment, the future sales estimate may be stored in the inventory database 210. The future sales estimate for the item may be updated in the future as the inventory residence time period increases. Updates to the future sales estimate may be triggered by executing the inventory valuation engine 212 periodically or by prompt from a user, programmer or administrator. In certain embodiments, in step 410, the generated future sales estimate may be displayed on a visual display device.

In step 412, in certain non-limiting embodiments, the generated future sales estimate may be programmatically compared to a first predetermined threshold to determine if it satisfies the first threshold (e.g., is lower than the first threshold). If so, in certain non-limiting embodiments, in step 414, one or more actions may be taken to adjust a price of the item and/or to adjust a notification policy associated with the item. Otherwise, none of the actions in step 414 may be taken.

In one example, if the generated future sales estimate is determined, in step 412, to be lower than the first threshold, this may indicate that the item is projected to perform poorly, i.e., result in few purchases. Therefore, the price of the item may need to be decreased to reflect the low demand for the item. In this case, in step 414, the price adjustment module 214 may be programmatically executed to apply a price discounting factor to the current price of the item to generate a discounted price. In one embodiment, the price discounting factor may be based on the future sales estimate generated compared to a previous sales estimate of the instant item (e.g., the sales estimate generated a month ago). In this case, the lower the future sales estimate for the instant item compared to the previous sales estimate for the instant item, the higher is the price discounting factor, and the lower is the discounted price for the instant item. In another embodiment, the price discounting factor may be based on the future sales estimate for the instant item compared to the future sales estimates generated for certain other items (e.g., for an instant item that is a first shampoo A, the future sales estimate for the first shampoo A may be compared to the future sales estimates for two other shampoos B and C). In this case, the lower the future sales estimate for the instant item compared to the future sales estimates for certain other items, the higher is the price discounting factor, and the lower is the discounted price for the instant item.

In another example, projected poor performance may indicate a need to change a notification policy to ensure that consumers' attention is drawn to items that are projected to perform better than the instant item, and also to avoid persistent intrusive notifications about the instant item even though consumers are unlikely to be interested in the instant item. In this case, in step 414, the notification generation module 218 may be programmatically executed to change or alter a notification policy dictating how and/or how often consumers are notified of the item analyzed in method 400. In one embodiment, the frequency at which consumers are notified of the item may be decreased (e.g., by notifying consumers once a week as opposed to daily) compared to other items with higher future sales estimates. In another embodiment, the rank, position or order at which the item is advertised among a plurality of items may be lowered (e.g., by displaying the instant item at position 100 among 130 item, rather than at position 50) compared to other items with higher future sales estimates. In another embodiment, a display of the instant item may be de-emphasized in any other suitable method compared to the display of other items with higher future sales estimates. In other embodiments, a combination of the above-indicated methods may be used to adjust a notification policy for the instant item.

In step 416, in certain non-limiting embodiments, the generated future sales estimate may be programmatically compared to a second predetermined threshold to determine if it satisfies the second threshold (e.g., is higher than the second threshold). If so, in step 418, one or more actions may be taken to adjust a price of the item, and/or to adjust a notification policy associated with the item, and/or to place a purchase order for the item. Otherwise, none of the actions in step 418 may be taken. In certain embodiments, the second threshold may be higher in value than the first threshold.

In one example, if the generated future sales estimate is determined, in step 416, to be higher than the second threshold, this may indicate that the item is projected to perform well, i.e., result in many purchases. Therefore, the price of the item may need to be increased to reflect the high demand for the item. In this case, in step 418, the price adjustment module 214 may be programmatically executed to apply a price increase factor to the current price of the item to generate an increased price.

In one embodiment, the price increase factor may be based on the future sales estimate generated compared to a previous sales estimate of the instant item (e.g., the sales estimate generated a month ago). In this case, the higher the future sales estimate for the instant item compared to the previous sales estimate for the instant item, the higher is the price increase factor, and the higher is the increased price for the instant item. In another embodiment, the price increase factor may be based on the future sales estimate for the instant item compared to the future sales estimates generated for certain other items (e.g., for an instant item that is a first shampoo A, the future sales estimate for the first shampoo A may be compared to the future sales estimates for two other shampoos B and C). In this case, the higher the future sales estimate for the instant item compared to the future sales estimates for certain other items, the higher is the price increase factor, and the higher is the increased price for the instant item.

In another example, projected good performance may indicate a need to change a notification policy to ensure that consumers' attention is drawn to the item, especially compared to other items that are projected to perform more poorly. In this case, in step 418, the notification generation module 218 may be programmatically executed to change or alter a notification policy dictating how and/or how often consumers are notified of the item analyzed in method 400. In one embodiment, the frequency at which consumers are notified of the item may be increased (e.g., by notifying consumers once a week as opposed to monthly) compared to other items with lower future sales estimates. In another embodiment, the rank, position or order at which the item is advertised among a plurality of items may be raised (e.g., by displaying the instant item at position 50 among 130 item, rather than at position 100) compared to other items with lower future sales estimates. In another embodiment, a display of the instant item may be emphasized in any other suitable method compared to the display of other items with lower future sales estimates. In other embodiments, a combination of the above-indicated methods may be used to adjust a notification policy for the instant item.

In another example, projected good performance may indicate a high future demand for the item that may or may not exceed the current inventory level of item. In one embodiment, the generated future sales estimate may be compared to the current inventory level. If the generated future sales estimate exceeds or is equal to the current inventory level, the purchase order generation module 216 may be programmatically executed to generate a purchase order for additional units of the item, and the purchase order may be sent to a merchant offering the item by transmitting, via a network device using the electronic communication generator module 220, one or more computer-executable instructions encoding information on the purchase order.

Figure 5:
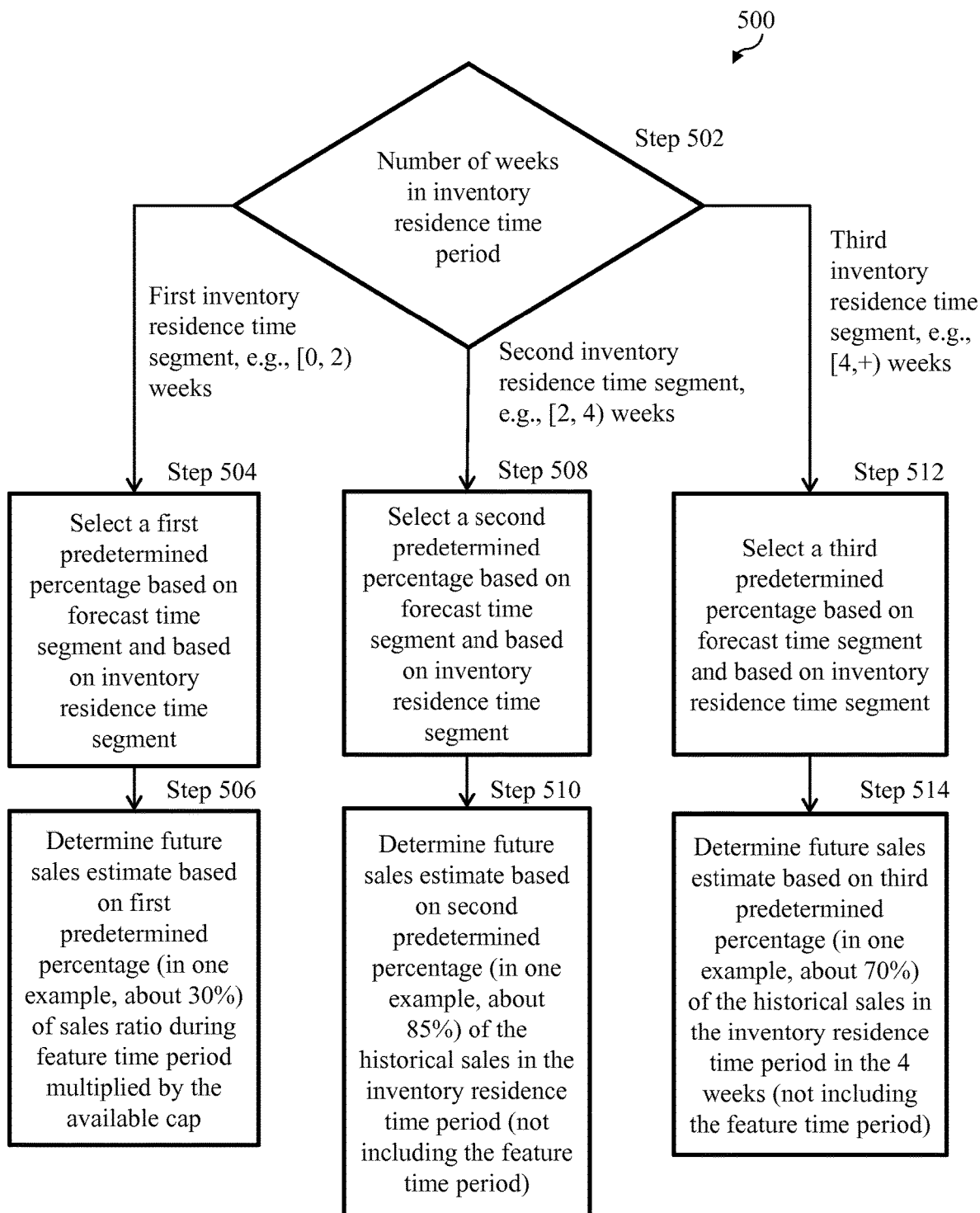
FIG. 5 is a flowchart illustrating an exemplary computer-executable method for programmatically generating a future sales estimate for an item in inventory.

FIG. 5 is a flowchart illustrating an exemplary computer-executable method 500 for generating a future sales estimate for an item. In some examples, method 500 may be performed by the inventory valuation engine 212 within the ambit of step 406 illustrated in FIG. 4.

In method 500, the inventory valuation engine 212 may determine whether the inventory residence time period falls within one of multiple time segments ("inventory residence time segment") and whether the forecast time period (i.e., the future time period for which sales are predicted) falls within one of multiple time segments (""""). Based on the inventory residence time segment and the forecast time segment, the inventory valuation engine 212 may determine a discount level to apply to prior performance data to generate a future sales estimate. Any suitable number of time segments and corresponding discount levels may be used including, but not limited to, one, two, three, four, five, six, seven, eight, nine, ten, etc.

In certain other embodiments, the discount level applied to prior performance data may be based on the inventory residence time segment, but independent of the forecast time segment.

Future Sales Estimate Generation for a First Inventory Residence Time Segment In step 502, if the inventory residence time period is determined to fall within a first inventory residence time segment (for example, if the item has been in inventory between zero and two weeks), then the future sales estimate may be based on a first predetermined percentage of the sales ratio of the item during the feature time period multiplied by the available cap. The sales ratio of the item during the feature time period may be accessed from the prior performance data accessed in step 402 of method 400. The sales ratio of the item may be the number of units of the item sold divided by the cap on the total number of units of the item during the feature time period. The available cap may be the cap on the total number of units of the item during the feature time period minus the number of units of the item sold. The cap may be the total number of units of the item for sale during a given time period (e.g., the feature time period or the inventory residence time period). In certain embodiments, the cap on an item for the feature time period may be different from the cap on the item for the inventory residence time period.

In step 504, the first predetermined percentage may be determined or selected based on the inventory residence time segment and the forecast time segment applicable for the future sales estimate. In certain embodiments, the first predetermined percentage may vary based on the forecast time period over which the future sales estimate is to apply, such that the percentages decrease the longer out in time the future sales estimate is to apply. In one non-limiting example, for generating a future sales estimate for a first four-week period, the first predetermined percentage may be about 30%; for generating a future sales estimate for a subsequent second four-week period, the first predetermined percentage may be about 25%; for generating a future sales estimate for the subsequent third four-week period, the first predetermined percentage may be about 20%; for generating a future sales estimate for the subsequent fourth four-week period, the first predetermined percentage may be about 15%; for generating a future sales estimate for the subsequent fifth and sixth four-week periods, the first predetermined percentage may be about 10%; and the like. Although forecast time segments are exemplified herein in four-week periods, one of ordinary skill in the art will recognize that other units of the forecast period may also be used.

In certain embodiments, the first predetermined percentage may range from about 10% to about 50% in certain non-limiting embodiments, and may be about 30% in one exemplary embodiment.

Upon selection of the first predetermined percentage, in step 506, the future sales estimate may be generated by the inventory valuation engine 212 for the applicable forecast period.

In one exemplary embodiment (Method A exemplified in Table 1), for an item having an inventory residence time period of [0 week, 2 weeks), $$\text{the future sales estimate} = (\text{first predetermined percentage of sales ratio in feature time period}) * (\text{available cap}) \quad \text{Equation (1A)}$$

In another exemplary embodiment (Method B exemplified in Table 1), for an item having an inventory residence time period of [0 week, 2 weeks), $$\text{the future sales estimate} = \text{Minimum of} ((\text{first predetermined percentage of sales ratio in feature time period}) * (\text{available cap})) \text{ and } (\text{number of units available in inventory}) \quad \text{Equation (1B)}$$

In Equation (1B), the number of units available in inventory for the forecast period may be determined from the cap or total number of units of the item. For example, for the first four-week period, the number of units of the item available in the inventory may be determined by subtracting the number of units already sold from the cap on the total number of units. For subsequent four-week periods, the number of units of the item available in the inventory may be determined by subtracting the number of units already sold and also subtracting the future sales estimates generated for the previous four-week periods from the cap on the total number of units.

If the future sales estimate is being generated for a time period that is not a four-week period (e.g., if the item will not remain in inventory for a full four-week period), then the numbers obtained above may be adjusted accordingly. Similarly, if the four-week period future sales estimate is generated based on prior purchase data over a period that is not a four-week period, then the numbers obtained above may be adjusted accordingly.

Table 1 below summarizes a non-limiting example of using method 500 illustrated in FIG. 5 to generate future sales estimates for an item having an inventory residence time period of between 0 and 2 weeks (as illustrated in steps 504 and 506 of FIG. 5). The numerical values represented in Table 1 are merely exemplary and illustrative and in no way limit the scope of this invention.

TABLE 1

Exemplary future sales estimates for an item having an inventory residence time period of between 0 and 2 weeks

| Forecast Period | Predetermined First Percentage used in Future Sales Estimate Generation | Method A: Future Sales Estimate Generation Equation 1A | Method B: Future Sales Estimate Generation Equation 1B |
|---|---|---|---|
| First 4-week period | 30% | 30% of sales ratio in feature time period * available cap | Minimum of (30% of sales ratio in feature time period * available cap) and (number of units available) |

TABLE 1-continued

Exemplary future sales estimates for an item having an inventory residence time period of between 0 and 2 weeks

| Forecast Period | Predetermined First Percentage used in Future Sales Estimate Generation | Method A: Future Sales Estimate Generation Equation 1A | Method B: Future Sales Estimate Generation Equation 1B |
|---|---|---|---|
| Second 4-week period | 25% | 25% of sales ratio in feature time period * available cap | Minimum of (25% of sales ratio in feature time period * available cap) and (number of units available) |
| Third 4-week period | 20% | 20% of sales ratio in feature time period * available cap | Minimum of (20% of sales ratio in feature time period * available cap) and (number of units available) |
| Fourth 4-week period | 15% | 15% of sales ratio in feature time period * available cap | Minimum of (15% of sales ratio in feature time period * available cap) and (number of units available) |
| Fifth 4-week period | 10% | 10% of sales ratio in feature time period * available cap | Minimum of (10% of sales ratio in feature time period * available cap) and (number of units available) |
| Sixth 4-week period | 10% | 10% of sales ratio in feature time period * available cap | Minimum of (10% of sales ratio in feature time period * available cap) and (number of units available) |

Future Sales Estimate Generation for a Second Inventory Residence Time Segment In step 502, if the inventory residence time period is determined to fall within a second inventory residence time segment (for example, if the item has been in inventory between two and four weeks), then the future sales estimate may be based on a second predetermined percentage of the sales or performance of the item during the inventory residence time period, not including sales or performance data in the feature time period. The sales or performance of the item during the inventory residence time period may be accessed from the prior performance data accessed in step 402 of method 400.

In step 508, the second predetermined percentage may be determined or selected based on the inventory residence time segment and the forecast time segment applicable for the future sales estimate. The second predetermined percentage may vary based on the forecast time period over which the future sales estimate is to apply, such that the percentages decrease the longer out in time the future sales estimate is to apply. In one non-limiting example, for generating a future sales estimate for a first four-week period, the second predetermined percentage may be about 85%; for generating a future sales estimate for a subsequent second four-week period, the second predetermined percentage may be about 75%; for generating a future sales estimate for the subsequent third four-week period, the second predetermined percentage may be about 65%; for generating a future sales estimate for the subsequent fourth four-week period, the second predetermined percentage may be about 60%; for generating a future sales estimate for the subsequent fifth and sixth four-week periods, the second predetermined percentage may be about 55%; and the like. Although forecast time periods are exemplified herein in four-week periods, one of ordinary skill in the art will recognize that other units of the forecast period may also be used.

In certain embodiments, the second predetermined percentage may range from about 70% to about 100% in certain non-limiting embodiments, and may be about 85% in one exemplary embodiment.

Upon selection of the second predetermined percentage, in step 510, the future sales estimate may be generated by the inventory valuation engine 212 for the applicable forecast period.

In one exemplary embodiment (Method C exemplified in Table 2), for an item having an inventory residence time period of [2 weeks, 4 weeks), $$\text{the future sales estimate} = (\text{second predetermined percentage}) * (\text{historical sales in inventory residence time period}) \quad \text{Equation (2A)}$$

In another exemplary embodiment (Method D exemplified in Table 2), for an item having an inventory residence time period of [2 weeks, 4 weeks), $$\text{the future sales estimate} = \text{Minimum of } ((\text{second predetermined percentage}) * (\text{historical sales in inventory residence time period})) \text{ and } (\text{number of units available in inventory}) \quad \text{Equation (2B)}$$

In Equation (2B), the number of units available in inventory for the forecast period may be determined from the cap or total number of units of the item. For example, for the first four-week period, the number of units of the item available in the inventory may be determined by subtracting the number of units already sold from the cap on the total number of units. For subsequent four-week periods, the number of units of the item available in the inventory may be determined by subtracting the number of units already sold and also subtracting the future sales estimates generated for the previous four-week periods from the cap on the total number of units.

If the future sales estimate is being generated for a time period that is not a four-week period (e.g., if the item will not remain in inventory for a full four-week period), then the numbers obtained above may be adjusted accordingly. Similarly, if the four-week period future sales estimate is generated based on prior purchase data over a period that is not a four-week period, then the numbers obtained above may be adjusted accordingly. For example, if an item sold 200 units in the last three weeks in inventory, then the future sales estimate for the next four-week period in one example may be (85% of 200)*(28/21).

Table 2 below summarizes a non-limiting example of using method 500 illustrated in FIG. 5 to generate future sales estimates for an item having an inventory residence time period of between 2 and 4 weeks (as illustrated in steps 508 and 510 of FIG. 5). The numerical values represented in Table 2 are merely exemplary and illustrative and in no way limit the scope of this invention.

TABLE 2

Exemplary future sales estimates for an item having an inventory residence time period of between 2 and 4 weeks

| Forecast Period | Predetermined Second Percentage used in Future Sales Estimate Generation | Method C: Future Sales Estimate Generation Equation 2A | Method D: Future Sales Estimate Generation Equation 2B |
|---|---|---|---|
| First 4-week period | 85% | 85% of sales in inventory residence time period | Minimum of (85% of sales in inventory residence time period) and (number of units available) |
| Second 4-week period | 75% | 75% of sales in inventory residence time period | Minimum of (75% of sales in inventory residence time period) and (number of units available) |
| Third 4-week period | 65% | 65% of sales in inventory residence time period | Minimum of (65% of sales in inventory residence time period) and (number of units available) |
| Fourth 4-week period | 60% | 60% of sales in inventory residence time period | Minimum of (60% of sales in inventory residence time period) and (number of units available) |
| Fifth 4-week period | 55% | 55% of sales in inventory residence time period | Minimum of (55% of sales in inventory residence time period) and (number of units available) |
| Sixth 4-week period | 55% | 55% of sales in inventory residence time period | Minimum of (55% of sales in inventory residence time period) and (number of units available) |

Future Sales Estimate Generation for a Third Inventory Residence Time Segment

In step 502, if the inventory residence time period is determined to fall within a third inventory residence time segment (for example, the item has been in inventory for over four weeks), then the future sales estimate may be based on a third predetermined percentage of the sales or performance of the item during the last four weeks in the inventory residence time period, not including sales or performance data in the feature time period. The sales or performance of the item during the inventory residence time period may be accessed from the prior performance data accessed in step 402 of method 400.

In step 512, the third predetermined percentage may be determined or selected based on the inventory residence time segment and the forecast time segment applicable for the future sales estimate. The third predetermined percentage may vary based on the forecast time period over which the future sales estimate is to apply, such that the percentages decrease the longer out in time the future sales estimate is to apply. In one non-limiting example, for generating a future sales estimate for a first four-week period, the third predetermined percentage may be about 70%; for generating a future sales estimate for a subsequent second four-week period, the third predetermined percentage may be about 60%; for generating a future sales estimate for the subsequent third four-week period, the third predetermined percentage may be about 50%; for generating a future sales estimate for the subsequent fourth four-week period, the third predetermined percentage may be about 45%; for generating a future sales estimate for the subsequent fifth and sixth four-week periods, the third predetermined percentage may be about 40%; and the like. Although forecast time periods are exemplified herein in four-week periods, one of ordinary skill in the art will recognize that other units of the forecast period may also be used.

The third predetermined percentage may range from about 50% to about 90% in certain non-limiting embodiments, and may be about 70% in one exemplary embodiment.

Upon selection of the third predetermined percentage, in step 514, the future sales estimate may be generated by the inventory valuation engine 212 for the applicable forecast period.

In one exemplary embodiment (Method E exemplified in Table 3), for an item having an inventory residence time period of [4 weeks, over 4 weeks), $$\text{the future sales estimate} = (\text{third predetermined percentage}) * (\text{historical sales in last 4 weeks of inventory residence time period}) \quad \text{Equation (3A)}$$

In another exemplary embodiment (Method F exemplified in Table 3), for an item having an inventory residence time period of [4 weeks, over 4 weeks), $$\text{the future sales estimate} = \text{Minimum of } ((\text{third predetermined percentage}) * (\text{historical sales in last 4 weeks of inventory residence time period})) \text{ and } (\text{number of units available in inventory}) \quad \text{Equation (3B)}$$

In Equation (3B), the number of units available in inventory for the forecast period may be determined from the cap or total number of units of the item. For example, for the first four-week period, the number of units of the item available in the inventory may be determined by subtracting the number of units already sold from the cap on the total number of units. For subsequent four-week periods, the number of units of the item available in the inventory may be determined by subtracting the number of units already sold and also subtracting the future sales estimates generated for the previous four-week periods from the cap on the total number of units.

If the future sales estimate is being generated for a time period that is not a four-week period (e.g., if the item will not remain in inventory for a full four-week period), then the numbers obtained above may be adjusted accordingly. Similarly, if the four-week period future sales estimate is generated based on prior purchase data over a period that is not a four-week period, then the numbers obtained above may be adjusted accordingly.

Table 3 below summarizes a non-limiting example of using method 500 illustrated in FIG. 5 to generate future sales estimates for an item having an inventory residence time period of and over 4 weeks (as illustrated in steps 512 and 514 of FIG. 5). The numerical values represented in Table 3 are merely exemplary and illustrative and in no way limit the scope of this invention.

nique is highly deficient because the quantity in inventory is not guaranteed to be sold in the future. For example, just because there are 25,000 units of pizza in inventory does not mean that all 25,000 units will be sold. This assumption may result in a gross overestimation of the value of the inventory. In a "second conventional technique" (indicated in Table 4), the prior performance of the item is accounted for and the number of consumers in the vicinity of the item. However, these techniques assume that all potential consumers in the consumer population will purchase the item, which also results in an overestimation of the value of the inventory. Conventional inventory valuation techniques tend to overestimate inventory values and do not account for relevant factors that determine future sales and the valuation of the inventory.

Table 4 below summarizes the actual sales of an item versus the future sales estimates generated by an exemplary technique, the first conventional technique and the second conventional technique. The data summarized in Table 4

TABLE 3

Exemplary future sales estimates for an item having an inventory residence time period of and over 4 weeks

| Forecast Period | Predetermined Third Percentage used in Future Sales Estimate Generation | Method E: Future Sales Estimate Generation Equation 3A | Method F: Future Sales Estimate Generation Equation 3B |
|---|---|---|---|
| First 4-week period | 70% | 70% of sales in last 4 weeks of inventory residence time period | Minimum of (70% of sales in last 4 weeks of inventory residence time period) and (number of units available) |
| Second 4-week period | 60% | 60% of sales in last 4 weeks of inventory residence time period | Minimum of (60% of sales in last 4 weeks of inventory residence time period) and (number of units available) |
| Third 4-week period | 50% | 50% of sales in last 4 weeks of inventory residence time period | Minimum of (50% of sales in last 4 weeks of inventory residence time period) and (number of units available) |
| Fourth 4-week period | 45% | 45% of sales in last 4 weeks of inventory residence time period | Minimum of (45% of sales in last 4 weeks of inventory residence time period) and (number of units available) |
| Fifth 4-week period | 40% | 40% of sales in last 4 weeks of inventory residence time period | Minimum of (40% of sales in last 4 weeks of inventory residence time period) and (number of units available) |
| Sixth 4-week period | 40% | 40% of sales in last 4 weeks of inventory residence time period | Minimum of (40% of sales in last 4 weeks of inventory residence time period) and (number of units available) |

In one exemplary embodiment, the second predetermined percentage (selected in step 508) may be higher than the first predetermined percentage (selected in step 504) and the third predetermined percentage (selected in step 512), and the third predetermined percentage (selected in step 512) may be higher than the first predetermined percentage (selected in step 504). In one example, the second and third predetermined percentages may be about or at least double the numerical value of the first predetermined percentage.

Exemplary embodiments illustrated in FIGS. 4 and 5 result in accurate and reliable valuation of inventory, and provide significant improvements over conventional inventory valuation techniques (indicated in Table 4). In a "first conventional technique" (indicated in Table 4), certain merchants conventionally value an item in inventory by subtracting the quantity in inventory from the forecasted demand for the item to generate an indication of the unfulfilled demand. However, this conventional valuation techindicates that exemplary techniques are significantly more accurate and reliable in predicting and estimating future sales than conventional inventory valuation techniques.

TABLE 4

Future sales estimates generated by exemplary techniques, a first conventional technique and a second conventional technique

| ID | City | Number of Weeks in Inventory | Actual Sale | Exemplary Technique | First Conventional Technique | Second Conventional Technique |
|---|---|---|---|---|---|---|
| 1 | Chicago | 0 | 447 | 289 | 7,906 | 1,145 |
| 2 | Chicago | 2 | 89 | 92 | 849 | 759 |
| 3 | Chicago | 4 | 368 | 203 | 7,749 | 2,100 |
| 4 | San Jose | 1 | 136 | 127 | 4,025 | 338 |
| 5 | San Jose | 5 | 354 | 263 | 8,818 | 1,124 |

TABLE 4-continued

Future sales estimates generated by exemplary techniques, a first conventional technique and a second conventional technique

| ID | City | Number of Weeks in Inventory | Actual Sale | Exemplary Technique | First Conventional Technique | Second Conventional Technique |
|----|------|------|------|------|------|------|
| 6 | Central Jersey | 1 | 65 | 50 | 4,075 | 162 |
| 7 | Central Jersey | 7 | 170 | 129 | 1,174 | 390 |

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by 1/20th, 1/10th, 1/5th, 1/3rd, 1/2nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications, combinations and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications, combinations and other embodiments are intended to be included within the scope of the appended claims. Although specific terms are employed herein, they are used in a generic and descriptive sense only and not for purposes of limitation.

What is claimed is:

1. A computer-executed method for programmatically adjusting a price of an item, the method comprising:
    tracking, using a network device in communication with a dataset, an inventory residence time period of an item defining an amount of time the item has been offered for sale as a non-featured item;
    programmatically accessing, from the dataset, using the network device, prior performance data associated with the item;
    executing an inventory valuation engine to determine an inventory residence time segment associated with the inventory residence time period of the item, determine a discount level to apply to the prior performance data based on the inventory residence time segment, and generate a future sales estimate for the item based on the discount level; and
    causing adjustment of a notification policy, based on the future sales estimate, such that the notification policy comprises an indication that the item is to be included in electronic marketing communications to consumer devices.

2. The method of claim 1, wherein executing the inventory valuation engine to generate the future sales estimate for the item based on the inventory residence time period and the prior performance data comprises:
    determining a forecast time segment associated with a forecast time period for the future sales estimate; and
    determining the discount level to apply to the prior performance data based on the inventory residence time segment and the forecast time segment.

3. The method of claim 1, further comprising:
    executing the inventory valuation engine to determine a sales ratio of the item during the inventory residence time segment;
    executing the inventory valuation engine to determine an available cap of the item within the inventory residence time segment; and
    executing the inventory valuation engine to determine the discount level to apply to the prior performance data based on the sales ratio and the available cap.

4. The method of claim 3, wherein executing the inventory valuation engine to determine the sales ratio of the item during the inventory residence time segment comprises:
    executing the inventory valuation engine to determine a number of units of the item sold in a second inventory residence time segment prior to the inventory residence time segment;
    executing the inventory valuation engine to determine a second available cap of the item within the second inventory residence time segment; and
    executing the inventory valuation engine to determine the sales ratio based on the number of units of the item sold and the second available cap of the item.

5. The method of claim 3, wherein executing the inventory valuation engine to determine the sales ratio of the item during the inventory residence time segment comprises:
    executing the inventory valuation engine to determine a number of units of the item sold in a feature time period prior to the inventory residence time segment;
    executing the inventory valuation engine to determine a second available cap of the item within the feature period; and executing the inventory valuation engine to determine the sales ratio based on the number of units of the item sold and the second available cap of the item.

6. The method of claim 1, wherein the item is a product, service or experience associated with a promotion offered by a promotion and marketing service.

7. The method of claim 1, further comprising:
based on the future sales estimate, automatically generating an electronic purchase order for purchasing additional units of the item; and
causing communication of the electronic purchase order to an external computing device.

8. The method of claim 1, further comprising, adjusting a price of the item based on the future sales estimate.

9. The method of claim 1, wherein causing adjustment of the notification policy comprises:
adjusting the notification policy of the electronic marketing communications indicating the item transmitted to consumer devices based on the future sales estimate; and
providing the electronic marketing communications to the consumer devices based on the adjusted notification policy.

10. An apparatus operable on a distributed computing system, the apparatus comprising:
a non-transitory dataset storage module configured to store an inventory residence time period and prior performance data associated with an item, wherein the inventory residence time period defines an amount of time the item has been offered for sale as a non-featured item; and
an inventory valuation engine configured to:
programmatically access, from a dataset stored on said non-transitory dataset storage module, the inventory residence time period associated with the item and the prior performance data associated with the item;
determine an inventory residence time segment associated with the inventory residence time period of the item;
determine a discount level to apply to the prior performance data based on the inventory residence time segment;
generate a future sales estimate for the item based on the discount level; and
provide the future sales estimate in order to cause adjustment of a notification policy, based on the future sales estimate, such that the notification policy comprises an indication that the item is to be included in electronic marketing communications to consumer devices.

11. The apparatus of claim 10, wherein the inventory valuation engine is further configured to:
determine a forecast time segment associated with a forecast time period for the future sales estimate; and
determine the discount level to apply to the prior performance data based on the inventory residence time segment and the forecast time segment.

12. The apparatus of claim 11, wherein the inventory valuation engine is further configured to:
determine a sales ratio of the item during the inventory residence time segment;
determine an available cap of the item within the inventory residence time segment; and
determine the discount level to apply to the prior performance data based on the sales ratio and the available cap.

13. The apparatus of claim 12, wherein the inventory valuation engine is further configured to:
determine a number of units of the item sold in a feature time period prior to the inventory residence time segment;
determine a second available cap of the item within the feature period; and
determine the sales ratio based on the number of units of the item sold and the second available cap of the item.

14. The apparatus of claim 12, wherein the inventory valuation engine is further configured to:
determine a number of units of the item sold in a second inventory residence time segment prior to the inventory residence time segment;
determine a second available cap of the item within the second inventory residence time segment; and
determine the sales ratio based on the number of units of the item sold and the second available cap of the item.

15. The apparatus of claim 10, wherein the item is a product, service or experience associated with a promotion offered by a promotion and marketing service.

16. The apparatus of claim 10, wherein the inventory valuation engine is further configured to:
based on the future sales estimate, execute a purchase order generation engine for generating a purchase order for purchasing additional units of the item; and
cause communication of the purchase order to an external computing device.

17. The apparatus of claim 10, wherein the inventory valuation engine is further configured to adjust a price of the item based on the future sales estimate.

18. The apparatus of claim 10, wherein the inventory valuation engine is further configured to:
adjust the notification policy of the electronic marketing communications indicating the item transmitted to consumer devices based on the future sales estimate; and
provide the electronic marketing communications to the consumer devices based on the adjusted notification policy.

19. A system, comprising:
one or more databases configured to store an inventory residence time period and prior performance data associated with an item, wherein the inventory residence time period defines an amount of time the item has been offered for sale as a non-featured item; and
one or more servers in operable communication with the one or more databases, the one or more servers being configured to:
track, using the one or more servers, an inventory residence time period of an item defining an amount of time the item has been offered for sale as a non-featured item;
programmatically access, from the one or more databases, the inventory residence time period associated with the item and the prior performance data associated with the item;
execute an inventory valuation engine to determine an inventory residence time segment associated with the inventory residence time period of the item, determine a discount level to apply to the prior performance data based on the inventory residence time segment and generate a future sales estimate for the item based on discount level; and
provide the future sales estimate in order to cause adjustment of a notification policy, based on the future sales estimate, such that the notification policy comprises an indication that the item is to be included in electronic marketing communications to consumer devices.

20. The system of claim 19, wherein the one or more servers configured to generate the future sales estimate for the item based on the discount level includes the one or more servers being configured to:
   determine a forecast time segment associated with a forecast time period for the future sales estimate;
   determine the discount level to apply to the prior performance data based on the inventory residence time segment and the forecast time segment.

21. The system of claim 19, wherein the one or more servers are further configured to:
   determine a sales ratio of the item during the inventory residence time segment;
   determine an available cap of the item within the inventory residence time segment; and
   determine the discount level to apply to the prior performance data based on the sales ratio and the available cap.

22. The system of claim 21, wherein the one or more servers configured to determine the sales ratio of the item during the inventory residence time segment includes the one or more servers being configured to:
   determine a number of units of the item sold in a second inventory residence time segment prior to the inventory residence time segment;
   determine a second available cap of the item within the second inventory residence time segment; and
   determine the sales ratio based on the number of units of the item sold and the second available cap of the item.

23. The system of claim 21, wherein the one or more servers configured to determine the sales ratio of the item during the inventory residence time segment includes the one or more servers being configured to:
   determine a number of units of the item sold in a feature time period prior to the inventory residence time segment;
   determine a second available cap of the item within the feature period; and
   determine the sales ratio based on the number of units of the item sold and the second available cap of the item.

24. The system of claim 19, wherein the item is a product, service or experience associated with a promotion offered by a promotion and marketing service.

25. The system of claim 19, wherein the one or more servers are further configured to:
   based on the future sales estimate, generate a purchase order for purchasing additional units of the item; and
   cause communication of the purchase order to an external computing device.

26. The system of claim 19, wherein the one or more servers are further configured to adjust a price of the item based on the future sales estimate.

27. The system of claim 19, wherein the one or more servers are further configured to:
   adjust the notification policy of the electronic marketing communications indicating the item transmitted to consumer devices based on the future sales estimate; and
   provide the electronic marketing communications to the consumer devices based on the adjusted notification policy.

* * * * *